Sept. 17, 1929.  O. K. MARTI  1,728,297
DRIVING MECHANISM
Filed Aug. 17, 1927  2 Sheets-Sheet 1
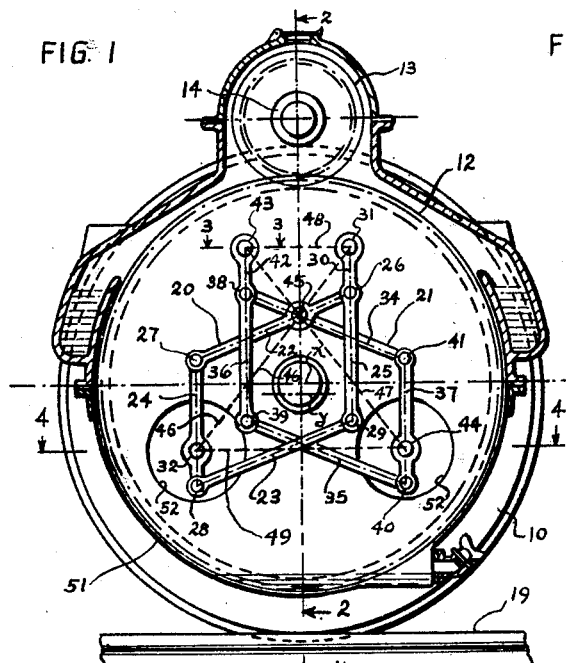
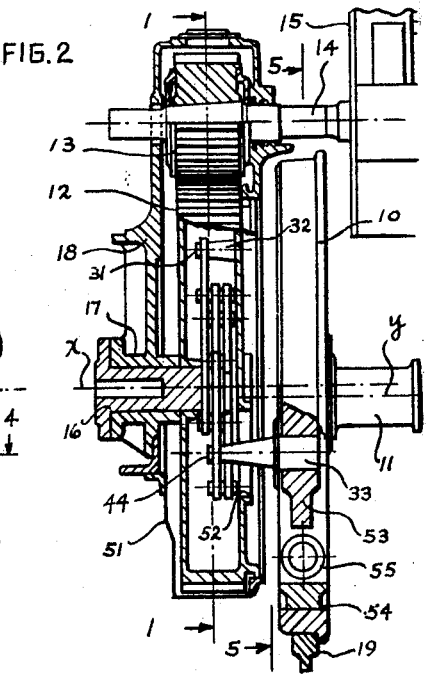
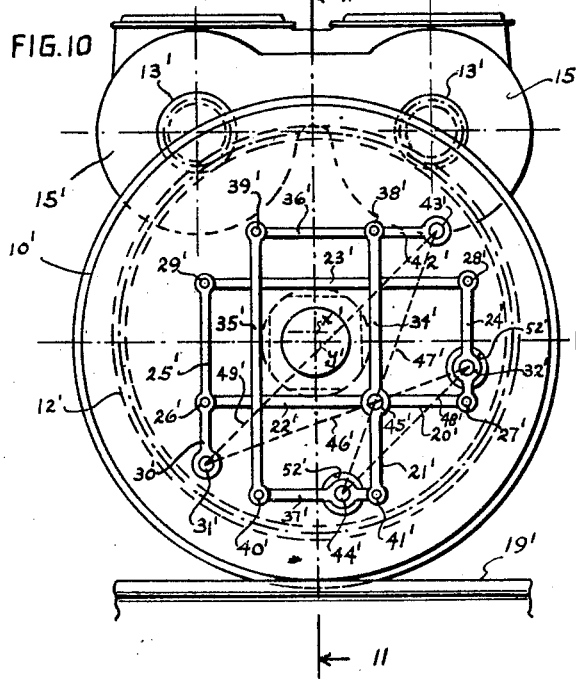
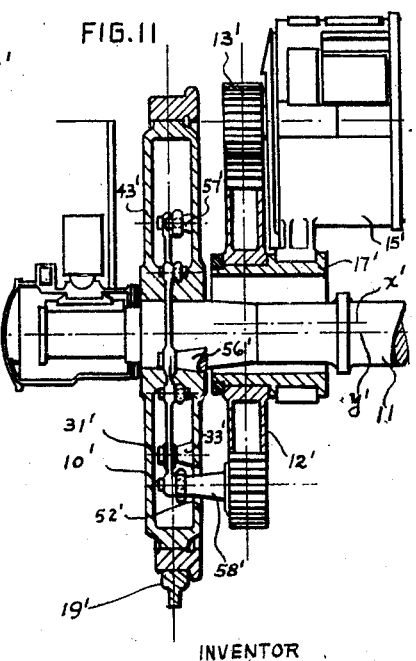
INVENTOR
BY Othmar K. Marti
Alfred H. Dyer
ATTORNEY Sept. 17, 1929.  O. K. MARTI  1,728,297
DRIVING MECHANISM
Filed Aug. 17, 1927   2 Sheets-Sheet 2
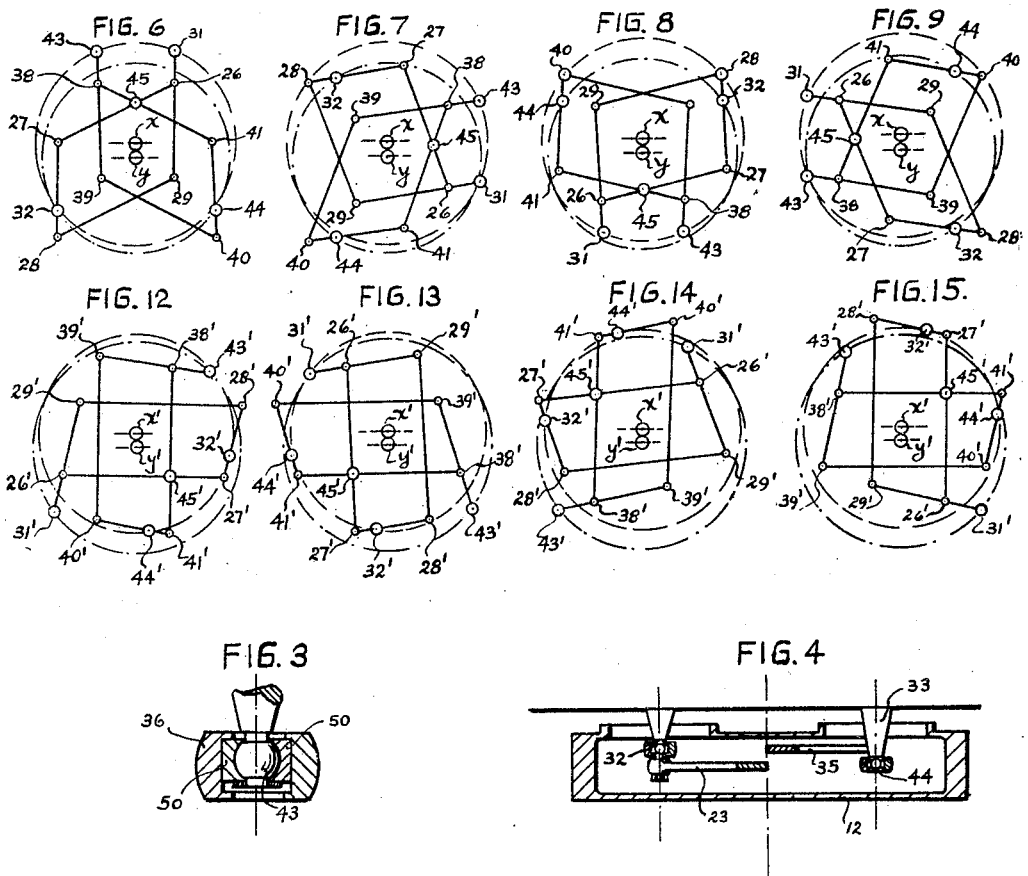
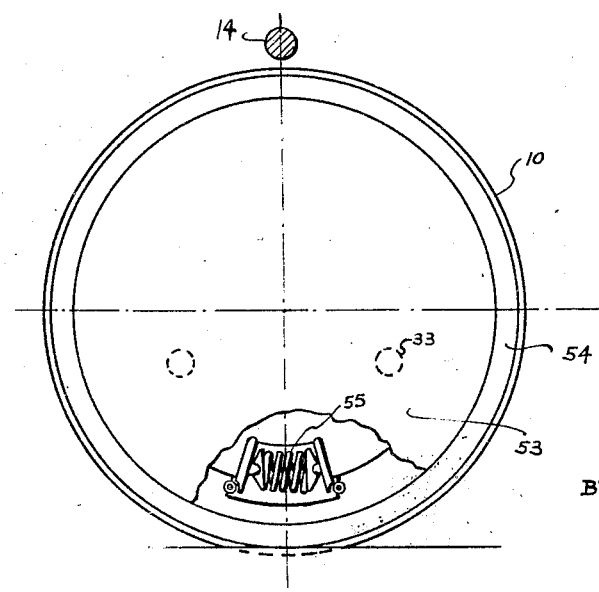
INVENTOR
Othmar K. Marti
BY
Alfred H. Dyson
ATTORNEY Patented Sept. 17, 1929

1,728,297

UNITED STATES PATENT OFFICE

OTHMAR K. MARTI, OF MERCHANTVILLE, NEW JERSEY, ASSIGNOR TO AMERICAN BROWN BOVERI ELECTRIC CORPORATION, OF CAMDEN, NEW JERSEY, A CORPORATION OF NEW YORK

DRIVING MECHANISM

Application filed August 17, 1927. Serial No. 213,479.

This invention relates to improvements in driving mechanism of the type comprising driving and driven elements supported for rotary movement with their respective axes of rotation eccentrically related.

Mechanism constructed in accordance with the present improvements is particularly adapted for use as an individual axle drive for electric locomotives of which the so-called Buchli drive is an example. In such drives the electric motor is mounted on the frame which is spring-supported on the axle to which is fixed the driving traction wheel, the power being transmitted through a pinion fixed on the armature shaft and meshing with a relatively large gear disposed adjacent to and either outside or inside the traction wheel depending upon conditions, the gear being journaled in a bearing fixed rigidly with respect to the frame, and means operatively connecting the gear to the traction wheel to freely permit of relative displacement of the gear with respect to the traction wheel in a vertical and lateral direction while transmitting the torque of the gear to the traction wheel at a substantially constant angular velocity in spite of any eccentricity, within practical working limits, which might exist between the gear and wheel. Each of these drives constructed heretofore has an inherent error such that when the degree of eccentricity increases above a relatively small amount, there is either a condition of injurious strains or shocks in the various parts, or a condition wherein a certain amount of relative angular movement takes place between the gear and traction wheel, at which instant the latter slips with respect to the rail. These conditions referred to take place and accordingly produce an undesirable effect several times during each revolution of the drive and its associated traction wheel, the result being that the tire of the wheel wears away due to slippage on the rail at an appreciably greater rate than that due to normal usage. It can be said of these gears, however, that under conditions of relatively small degrees of eccentricity, their inherent error is not such as to produce or cause detrimental effects, it being noted in this connection that the effect of this error becomes more and more pronounced as the degree of eccentricity increases until a point is reached where injurious strains and slippage occur.

One of the objects of the present invention, therefore, is to provide improved driving mechanism of the character referred to wherein the degree of eccentricity between the driving and driven elements may be varied through the entire permissible range of eccentricity independently of relative angular movement between such elements.

Another object is to provide improved driving mechanism of the character referred to wherein the driving and driven elements are operatively connected by a frame-like structure comprised entirely of rigid links and permitting of bodily relative vertical and lateral movements between such elements independently of relative angular movement between the same.

Another object is to provide improved driving mechanism of the character referred to which is of relatively simple and compact construction and which may be economically manufactured.

Other objects and advantages will hereinafter appear.

For the purpose of illustrating the invention, several embodiments thereof are shown in the drawings, wherein:

Figure 1 is a side elevational view, partly in section, the section being taken on the line 1—1 in Fig. 2;

Fig. 2 is a vertical sectional view, partly broken away, the section being taken on the line 2—2 in Fig. 1;

Fig. 3 is an enlarged sectional view taken on the line 3—3 in Fig. 1;

Fig. 4 is an enlarged sectional view taken on the line 4—4 in Fig. 1;

Fig. 5 is a side elevational view taken on the line 5—5 in Fig. 2;

Figs. 6 to 9 are diagrammatic views showing the relative positions assumed by the various parts in Fig. 1 at different angular positions of the traction wheel and gear;

Fig. 10 is a view similar to Fig. 1, showing a modification, some of the parts being removed for the sake of clearness;

Fig. 11 is a vertical sectional view, the section being taken on the line 11—11 in Fig. 10; and Figs. 12 to 15 are diagrammatic views showing the relative positions assumed by the various parts in Fig. 10 at different angular positions of the traction wheel and gear.

The driven element or traction wheel 10 is fixed on the axle 11 and the driving element or relatively large gear 12 meshes with the pinion 13 fixed on the armature shaft 14 of the electric motor 15 mounted on the frame of the locomotive which is spring-supported in the usual manner on the axle 11, the gear 12 being provided with a suitable stud 16 journaled in the bearing 17 in the side-frame 18 rigid with the main frame, the armature shaft 14 being also journaled in the side-frame, as shown, whereby the distance between the respective axes of rotation of gear 12 and pinion 13 is fixed, while the main and side-frames and the motor, pinion and gear carried thereby are relatively movable vertically with respect to the traction wheel 10 by virtue of the usual springs interposed between axle 11 and the main frame. Such an arrangement, therefore, provides that the greater and heavier parts are spring-supported on the axle, the axis of rotation $x$ of the gear 12 being eccentrically related, in more or less degree, with respect to the axis of rotation $y$ of the traction wheel 10 in accordance with the deflection of the supporting springs between axle 11 and the main frame as the locomotive rides over irregularities in the track or road-bed 19.

Complementary frames, designated generally in Fig. 1 by the reference numerals 20 and 21, are disposed, as shown, around the axes of rotation $x$ and $y$ of wheel 10 and gear 12 and provide an operative connection therebetween permitting of rotation of the same concurrently with the existence of eccentric relation between said axes. The frame 20 comprises the links 22, 23, 24 and 25 pivotally connected at the points or by the pins 26, 27, 28 and 29, the distances 26—27 and 29—28 being equal, and the distances 26—29 and 27—28 being equal. The link 25 is provided with the extension 30 pivotally connected to gear 12 at the point or by the pin 31 received by a boss 32 which might be formed integrally with gear 12, as indicated in Fig. 2. The frame 20 is pivotally connected to wheel 10 at the point or by the pin 32 received by a suitable stud with which the wheel is provided and which is similar to the stud 33 hereinafter referred to.

The second frame 21 comprises the links 34, 35, 36 and 37 pivotally connected at the points or by the pins 38, 39, 40 and 41, the distances 38—41 and 39—40 being equal to each other and to the distances 26—27 and 29—28, the distances 38—39 and 41—40 being equal to each other and to the distances 26—29 and 27—28. The link 36 is provided with the extension 42 equal in length to extension 30 and pivotally connected, in the same manner as the latter, to gear 12 at the point or by the pin 43. The frame 21, similar to frame 20, is pivotally connected to wheel 10 at the point or by the pin 44 received by the stud 33 with which wheel 10 is also provided, the arrangement being such that the distances 27—32 and 41—44 are equal.

The complementary frames 20 and 21 are pivotally connected together at the point or by the pin 45 passing through their respective links 22 and 34, the arrangement being such that the distances 26—45 and 45—38 are equal.

In view of the foregoing construction and arrangement, it will be seen that the ratios of 31—26 over 27—32 and 43—38 over 41—44 are always fixed and equal and, further, that in all positions of deflection of frames 20 and 21 the imaginary line 46 connecting points 31 and 32 and the imaginary line 47 connecting points 43 and 44 will always pass through point 45 and, still further, that for any positions or deflections of the frames the ratios of 31—45 over 45—32 and 43—45 over 45—44, while varying accordingly, will always be equal to each other so that for any position which gear 12 might assume relatively vertically with respect to wheel 10, the points 31, 43, 32 and 44 will always define a trapezoid, or, in other words, the imaginary line 48 connecting points 31 and 43 will always be parallel to the imaginary line 49 connecting points 32 and 44.

As illustrated diagrammatically in Figs. 6 to 9, the points 31, 43, 32 and 44 will always define a trapezoid, and the imaginary lines 48 and 49 will accordingly always be parallel regardless of the degree of eccentricity between axes $x$ and $y$ and the angular positions assumed by wheel 10 and gear 12 during a complete revolution, the result being that when any permissible degree of eccentricity exists between the axes $x$ and $y$ during one complete revolution thereof, no relative angular movement between the same is necessary in any angular position of the latter during such revolution to allow for such condition of eccentricity therebetween.

From the foregoing it will be seen that improved driving mechanism has been provided wherein the driving and driven elements can rotate, with their respective axes of rotation eccentrically related independently of any relative angular movement between the elements. In the present application of the invention shown, therefore, no slip of traction wheel 10 with respect to rail 19 will occur during a complete revolution of the wheel and the driving element or gear 12, although their respective axes of rotation $x$ and $y$ may be eccentrically related the greatest degree permissible and the degree of eccentricity vary during such revolution, the rates of rotation of wheel 10 and gear 12 during one complete revolution thereof being at any instant equal to each other.

As more clearly shown in Fig. 3, the head of pin 43 is made spherical and suitable block sections 50 are fitted about this head and provide a swivel connection between the same and the associated end of link 36 whereby universal movement is permissible at this point. A similar universal connection is also provided between pin 31 and the associated end of link 25, and also between pins 32 and 44 and links 24 and 37 respectively, as indicated more clearly in Fig. 4. By reason of the foregoing universal connections between the various parts, a certain amount of tilting movement of wheel 10 is permitted with respect to gear 12 such as might occur in traversing a curve or turn in the track. The various other points at which the links of frames 20 and 21 are pivotally connected might also be provided with suitable universal joints, if so desired.

As more clearly shown in Fig. 2, the operating connection comprising frames 20 and 21 is disposed entirely within gear 12, a suitable casing 51 being fitted over the lower half of the gear and forming with side-frame 18 a protective casing for the parts, the gear 12 being provided with suitable openings 52 for receiving the studs 33 and permitting sufficient play of the latter, such as would result from any condition of eccentricity between the axes $x$ and $y$.

For the purpose of absorbing any shocks between the traction wheel 10 and motor 15, such as might occur upon rapid acceleration of the latter, the wheel is made in two parts and comprises a hub portion 53 and a rim portion 54, suitable spring units, designated generally in Fig. 5 by reference numeral 55, being interposed between such portions in the well-known manner.

In the modification shown in Figs. 10 to 15, the complementary frames 20' and 21' are disposed substantially at a right angle with respect to each other and in lieu of being disposed within the gear, are disposed within the traction wheel 10' fixed on the axle 11' extending through the hollow bearing or quill 17' on which is journaled the gear 12'.

The frame 20' comprises the links 22' 23' 24' and 25' pivotally connected, as shown, at the points or by the pins 26' 27' 28' and 29', the arrangement being such that the distances 26'—27' and 29'—28' are equal and the distances 27'—28' and 26'—29' are equal. The link 25' is provided with the extension 30' pivotally connected to wheel 10' at the point or by the pin 31' received by the boss 33' with which the wheel is provided. The frame 20' is, further, pivotally connected to gear 12' at the point or by the pin 32' received by a stud 56' with which gear 12' is provided.

The frame 21' comprises the links 34', 35', 36' and 37' pivotally connected, as shown, at the points or by the pins 38' 39' 40' and 41', the distances 38'—41' and 39'—40' being equal to each other and to the distances 26'—27' and 29'—28', the distances 38'—39' and 41'—40' being equal to each other and to the distances 27'—28' and 26'—29'. The link 36' is provided with the extension 42' equal in length to extension 30' and pivotally connected at the point or by the pin 43' to wheel 10', the pin being received by a suitable boss 57' with which the wheel is provided. Frame 21' is pivotally connected to gear 12' at the point or by the pin 44' passing through link 37', as shown, and being received by a suitable stud 58' similar to stud 56' and with which gear 12' is also provided, the arrangement being such that the distancees 27'—32' and 41'—44' are equal.

The frames 20' and 21' are pivotally connected at the point or by the pin 45' passing through their respective links 22' and 34', the arrangement being such that the distances 27'—45' and 41'—45' are equal.

The wheel 10' is provided with suitable openings 52' for accommodating studs 56' and 58' and permitting sufficient play of the latter, such as would occur in event of eccentric relation between axes $x'$ and $y'$.

By reason of the foregoing construction and arrangement, the imaginary line 46' connecting points 31' and 32' and the imaginary line 47' connecting points 43' and 44' will pass through the point 45' for all positions of angularity or deflection of the frames and, further, for all such positions, the points 32', 44', 31' and 43' will define a trapezoid, the imaginary line 48' connecting points 32' and 44' and the imaginary line 49' connecting points 31' and 43' being accordingly always parallel.

In the modification of Figs. 10 and 11, two motors 15' are shown, the pinions 13' fixed to the armature shafts of these motors being disposed as shown and meshing with gear 12'.

The manner of operation of this modified form is similar to that of the embodiment shown in Figs. 1 to 9, and is more clearly illustrated by Figs. 12 to 15, the action being such that for all angular positions of gear 12' and wheel 10' during one complete revolution thereof the points 32' 44' 31' and 43' define a trapezoid and the imaginary lines 48' and 49' referred to above are always parallel regardless of the degree of eccentricity between the axes of rotation $x'$ and $y'$ of the wheel and gear, so that there will be smooth-running action and no tendency for any slip to occur between the traction wheel 10' and the rail 19'.

It is contemplated to provide universal or swivel connections of the general type shown in Fig. 3 at the points 32' 44' 31' and 43' to allow for tilting of wheel 10' with respect to gear 12', such as might occur in rounding a curve. Such universal or swivel connections might also be provided at the other pivotal points of connection between the various links comprising the frames, if so desired.

The extreme flexibility of the present improved driving mechanism permits of normal disposition of axes $x$ and $x'$, as shown, eccentric to and above axes $y$ and $y'$, respectively, whereby a greater ratio between the pinion and gear can be obtained than has been practicable in driving mechanism of this type constructed heretofore. In this connection, however, it would be entirely feasible to support the wheel and gear so that their respective axes of rotation are normally concentric, and such arrangement is contemplated.

Further in regard to Fig. 3, it is to be noted that a certain amount of play or sliding movement of the block sections 50 in the associated end of link 36 is permissible, such arrangement or construction allowing for greater flexibility of movement between the traction wheel and gear, the action being such that the sections 50 slide or shift laterally in the head of the link a corresponding amount upon tilting of the traction wheel and gear with respect to each other, such as would occur in rounding a banked curve, at which time the respective axes of rotation of the wheel and gear would be out of parallel relation.

While the improved driving mechanism has been shown embodied in and forming part of an individual axle drive for an electric locomotive, it is to be understood that the present invention is of much broader adaptation and that the improved mechanism is well adapted for use in any environment where similar conditions are present, that is, where there is a driving and driven element supported for rotary movement with their respective axes bearing relation to each other at either a fixed or at varying and different degrees of eccentricity and where it is desired that no relative angular movement take place between the driving and driven elements during one complete revolution thereof.

It will be understood, furthermore, that various changes in the size, shape and arrangement of the parts might be adopted without departing from the spirit of the invention or the scope of the claims.

The invention claimed is:

1. The combination with driving and driven elements supported for rotary movement with their respective axes of rotation eccentrically related, of a plurality of complementary connected frames connected to said elements and providing an operative connection therebetween permitting of such movement thereof concurrently with the existence of eccentric relation between said axes, said frames being so interrelated that for conditions of varying degrees of eccentricity of said axes imaginary lines connecting certain of the points of connection of said frames with said elements intersect at the point of connection between said frames.

2. The combination with driving and driven elements supported for rotary movement with their respective axes of rotation eccentrically related, of a plurality of complementary frames connected to said elements and providing an operative connection therebetween permitting of such movement thereof concurrently with the existence of eccentric relation between said axes, said frames being so interrelated that for conditions of varying degrees of eccentricity of said axes the points of connection of said frames with said elements define a trapezoid.

3. The combination with driving mechanism including rotatable driving and driven elements supported for such relative movement as to place their respective axes of rotation in eccentric relation, of complementary closed frames directly and pivotally connected to each other and each connected to both of said elements and providing an operative connection therebetween.

4. In driving mechanism comprising driving and driven elements supported for rotary movement about substantially parallel axes, complementary frame-like structures surrounding said axes and connected to said elements to provide an operative connection therebetween.

5. The combination with a vehicle having a traction wheel and a driving element therefor supported adjacent said wheel for rotation about an axis substantially parallel to and disposed in substantially the same vertical plane with the axis of rotation of said wheel and for bodily relative movement with respect to said wheel such as to place said axes at varying degrees of eccentricity with respect to each other, of a plurality of complementary closed frames directly and pivotally connected to each other and cooperating to connect said wheel to said element for rotation therewith concurrently with existence of such condition of eccentricity.

6. In a power-driven vehicle, a traction wheel provided with a plurality of studs, a driving element supported for rotation about an axis substantially parallel to and disposed in substantially the same vertical plane with the axis of rotation of said wheel and for bodily relative movement with respect to said wheel such as to place said axes at varying degrees of eccentricity with respect to each other, and means connecting said wheel and element for rotation together and comprising a plurality of complementary frames connected to said studs and to said element, said studs passing through said element into connecting relation with said frames.

7. In driving mechanism, rotatable driving and driven elements, and a plurality of complementary link-frames connecting the same for rotation together, each of said frames having a link provided with an extension connected to one of said elements and another link connected to the other of said elements.

8. In driving mechanism, driving and driven elements rotatable about substantially parallel axes disposed in substantially the same vertical plane, said elements being supported for bodily movement vertically with respect to each other to place said axes at varying degrees of eccentricity, and means providing an operative connection between said elements and comprising a plurality of complementary four-sided frames each disposed around said axes and connected to said elements.

In witness whereof, I hereto affix my signature.

OTHMAR K. MARTI.